(12) United States Patent
Hoover et al.

(10) Patent No.: US 9,870,704 B2
(45) Date of Patent: Jan. 16, 2018

(54) CAMERA CALIBRATION APPLICATION

(75) Inventors: Martin Edward Hoover, Rochester, NY (US); David Martin Todd Jackson, Arlington, VA (US); Wencheng Wu, Webster, NY (US); Vladimir Kozitsky, Rochester, NY (US)

(73) Assignee: Conduent Business Services, LLC, Dallas, TX (US)

( * ) Notice: Subject to any disclaimer, the term of this patent is extended or adjusted under 35 U.S.C. 154(b) by 961 days.

(21) Appl. No.: 13/527,673

(22) Filed: Jun. 20, 2012

(65) Prior Publication Data
US 2013/0342706 A1  Dec. 26, 2013

(51) Int. Cl.
H04N 17/02 (2006.01)
G08G 1/017 (2006.01)
H04N 17/00 (2006.01)
G06T 7/80 (2017.01)

(52) U.S. Cl.
CPC ............ G08G 1/0175 (2013.01); G06T 7/80 (2017.01); H04N 17/002 (2013.01); G06T 2207/10016 (2013.01); G06T 2207/30204 (2013.01); G06T 2207/30236 (2013.01)

(58) Field of Classification Search
None
See application file for complete search history.

(56) References Cited

U.S. PATENT DOCUMENTS

| | | | | |
|---|---|---|---|---|
| 5,001,650 A | * | 3/1991 | Francis et al. ................. | 348/169 |
| 5,081,685 A | * | 1/1992 | Jones, III ............. | G06K 9/2054 |
| | | | | 382/105 |
| 5,467,634 A | * | 11/1995 | Brady .................. | G01B 11/022 |
| | | | | 340/937 |
| 5,473,931 A | * | 12/1995 | Brady .................. | G01B 11/022 |
| | | | | 340/937 |
| 5,734,337 A | * | 3/1998 | Kupersmit .................... | 340/937 |
| 6,766,038 B1 | * | 7/2004 | Sakuma .................. | G01P 3/806 |
| | | | | 340/933 |
| 6,988,052 B2 | | 1/2006 | Hilliard et al. | |
| 7,949,150 B2 | | 5/2011 | Haering et al. | |
| 2001/0012985 A1 | * | 8/2001 | Okamoto .............. | G06T 7/0018 |
| | | | | 702/94 |
| 2005/0179801 A1 | * | 8/2005 | Miwa ...................... | G03B 15/00 |
| | | | | 348/335 |
| 2006/0095199 A1 | * | 5/2006 | Lagassey ....................... | 701/117 |
| 2006/0152589 A1 | * | 7/2006 | Morrison ............... | G06K 9/209 |
| | | | | 348/208.1 |

(Continued)

FOREIGN PATENT DOCUMENTS

JP 2003050107 A * 2/2003

*Primary Examiner* — Andy Rao
*Assistant Examiner* — Samuel D Fereja
(74) *Attorney, Agent, or Firm* — Kevin Soules; Luis M. Ortiz; Kermit D. Lopez

(57) ABSTRACT

A method and system for camera calibration comprises configuring a calibration target comprising calibration reflectors on a test vehicle. Video of a test scene is collected. Next the test vehicle is identified as it enters the test scene and recorded as it passes through the test scene. The position of the calibration target in each frame of the video is determined and the corresponding individual position of each calibration reflector for each frame of the recorded frames is used to construct a camera calibration map to calibrate the video camera.

15 Claims, 7 Drawing Sheets

(56) References Cited

U.S. PATENT DOCUMENTS

| | | | |
|---|---|---|---|
| 2007/0058717 A1* | 3/2007 | Chosak | G06K 9/32 375/240.08 |
| 2008/0095403 A1* | 4/2008 | Benhammou | G06K 9/00785 382/104 |
| 2008/0166018 A1* | 7/2008 | Li | G06K 9/00805 382/105 |
| 2008/0240616 A1* | 10/2008 | Haering et al. | 382/294 |
| 2008/0303906 A1* | 12/2008 | Poulin | G01B 11/2504 348/187 |
| 2009/0045323 A1* | 2/2009 | Lu | B60Q 1/1423 250/208.1 |
| 2010/0283856 A1* | 11/2010 | Kahler et al. | 348/149 |
| 2010/0289897 A1* | 11/2010 | Arai | G06K 9/3258 348/148 |
| 2011/0038510 A1* | 2/2011 | Nakamura | 382/106 |
| 2011/0122257 A1* | 5/2011 | Kirk | G01C 11/06 348/187 |
| 2011/0205340 A1* | 8/2011 | Garcia | G01S 7/4972 348/46 |
| 2011/0310255 A1* | 12/2011 | Medeiros et al. | 348/187 |
| 2012/0106802 A1* | 5/2012 | Hsieh | G06K 9/3258 382/105 |
| 2012/0195470 A1* | 8/2012 | Fleming et al. | 382/103 |
| 2013/0022236 A1* | 1/2013 | Chang et al. | 382/103 |
| 2015/0109445 A1* | 4/2015 | Wedajo | G03B 7/08 348/148 |

* cited by examiner

CAMERA CALIBRATION APPLICATION

TECHNICAL FIELD

Embodiments are generally related to the field of computer systems and methods. Embodiments are also related to methods and systems for object tracking. Embodiments are further related to methods and systems for calibrating object tracking cameras.

BACKGROUND OF THE INVENTION

Video-based speed detection and other such traffic monitoring applications have become increasingly prevalent in modern society. In order for such monitoring to provide accurate data, the tracking cameras must be calibrated.

In speed detection applications, it is critical that the cameras used to collect video are calibrated. Proper improper calibration can create significant error in the ultimate speed determination. For example, if a tracking camera has a 5% magnification along the direction of travel due to incorrect calibration or change of focus, any speed detection from the camera will have a corresponding 5% bias.

Prior art methods and systems exist for calibrating cameras. However, these methods and systems use static calibration targets for camera calibration. This may include, for example, placing a static checkerboard in the camera's field of view. However, the use of these techniques requires that either the camera be relocated somewhere that does not disturb traffic, or the static target be placed such that they do not disturb traffic. Placing the targets inherently requires traffic diversion. This may include creating a roadwork zone where traffic is stopped so that the targets can be placed.

In addition, the use of static targets can distract motorists as they pass the targets, and closing roads for camera calibration is costly for society. Therefore, improved methods and systems are necessary for cost-effective and accurate camera calibration.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for a method and system for camera calibration.

It is another aspect of the disclosed embodiments to provide for an enhanced method and system for calibrating traffic monitoring cameras.

It is yet another aspect of the disclosed embodiments to provide an enhanced method and system for calibrating traffic monitoring cameras without closing the monitored roads.

The aforementioned aspects and other objectives and advantages can now be achieved as described herein. A method and system for camera calibration comprises configuring a calibration target comprising calibration reflectors on a test vehicle, collecting video of a test scene with a video camera, identifying the test vehicle as it enters the test scene, recording a plurality of video frames of the calibration target as it passes through the test scene, detecting the position of the calibration target in each frame of the plurality of recorded frames, identifying the corresponding individual position of each calibration reflector for each frame of the recorded frames, and constructing a camera calibration map to calibrate the video camera.

In one embodiment, identifying the test vehicle as it passes through the test scene includes applying an automated license plate recognition check for each vehicle that enters the test scene until the test vehicle is identified.

The calibration target can be configured to be a grid of at least four calibration reflectors. The relative location of each calibration reflector within the grid is known and the grid covers as much of the field of view of the test scene as possible. Identifying the individual position of each of the calibration reflectors for each frame of collected video can include identifying a centroid for each of the calibration reflectors in each frame of the video.

In one embodiment, constructing the camera calibration map can further comprise selecting an arbitrary fixed reference point in the collected video as an origin, constructing a first calibration map for each frame of the collected video, and then averaging all of the first calibration maps.

In a preferred alternative embodiment, constructing the camera calibration map comprises selecting an arbitrary fixed reference point in the collected video as an origin and applying an iterative data alignment and outlier algorithm.

The method can include the use of a traffic surveillance video feed wherein the test scene is an open roadway or an open traffic intersection.

In another embodiment of the invention, a system for camera calibration comprises a calibration target comprising calibration reflectors mounted on a test vehicle, a video camera configured to collect video of a test scene, a test vehicle identification module configured to identify the test vehicle as it enters the test scene and record a plurality of video frames of the calibration target as it passes through the test scene, a calibration point identification module configured to detect the position of the calibration target in each frame of the video and identify a corresponding individual position of each of the calibration reflectors in each frame, and a camera calibration construction module configured to construct a camera calibration map to calibrate the video camera.

The test vehicle identification module is further configured to apply an automated license plate recognition check for each vehicle that enters the test scene until the test vehicle is identified.

The calibration target is a grid of at least four calibration reflectors wherein the relative location of each of the calibration reflectors within the grid is known and the grid covers as much of the field of view of the test scene as possible. The calibration point identification module is configured to identify a centroid for each of the calibration reflectors in each frame of the video.

In one embodiment of the invention, the camera calibration construction module can select an arbitrary fixed reference point in the collected video as an origin, construct a first calibration map for each frame of the collected video, and average all of the first calibration maps.

In a preferred alternative embodiment of the invention, camera calibration construction module is further configured for selecting an arbitrary fixed reference point in the collected video as an origin, and applying an iterative data alignment and outlier algorithm.

The collected video may be, for example, a traffic surveillance video feed with the test scene being an open roadway or an open traffic intersection.

In another embodiment of the invention, a method for camera calibration comprises configuring a calibration target comprising a plurality of calibration reflectors on a test vehicle wherein the calibration target is configured to be a grid of calibration reflectors wherein the relative location of each of the plurality of calibration reflectors within the grid is known, collecting video of a test scene with a video camera, identifying the test vehicle as it enters the test scene by applying an automated license plate recognition check for each vehicle until the test vehicle is identified, recording a plurality of video frames of the calibration target comprising the calibration reflectors as they pass through the test scene, detecting the position of the calibration target in each frame of the plurality of recorded frames, identifying the corresponding individual position of the centroid of each of the calibration reflectors for each frame of video, and constructing a camera calibration map to calibrate the video camera.

The method of constructing the camera calibration map may further comprise selecting an arbitrary fixed reference point in the collected video as an origin, constructing a first calibration map for each frame of the collected video, and averaging all of the first calibration maps.

In a preferred alternative embodiment, the method of constructing a camera calibration map comprises selecting an arbitrary fixed reference point in the collected video as an origin and applying an iterative data alignment and outlier algorithm.

The test scene can be an open roadway or an open traffic intersection.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited, merely to illustrate at least one embodiment and are not intended to limit the scope thereof.

Figure 1:
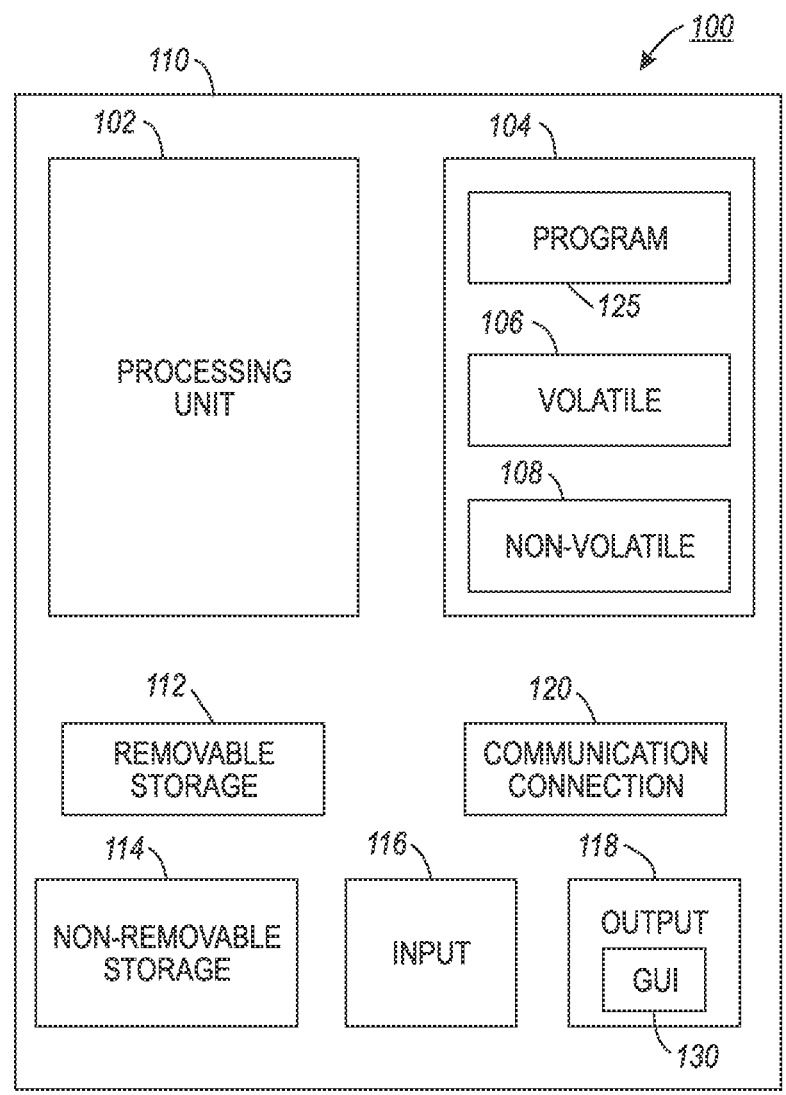
FIG. 1 depicts a block diagram of a computer system which is implemented in accordance with the disclosed embodiments.

A block diagram of a computer system 100 that executes programming for executing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data, including video frames.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a photographic camera, video camera, tracking device, or the like. The communication connection may include a Local Area Network (LAN), a Wide Area Network (WAN) or other networks. This functionality is described in more detail in FIG. 2.

Output 118 is most commonly provided as a computer monitor but may include any computer output device. Output 118 may also include a data collection apparatus associated with computer system 100. In addition, input 116, which commonly includes a computer keyboard and/or pointing device such as a computer mouse, allows a user to select and instruct computer system 100. A user interface can be provided using output 118 and input 116.

Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example program module 125, are stored on a non-transitory computer-readable medium and are executable by the processing unit 102 of computer 110. Program module 125 may include a computer application. A hard drive, CD-ROM, RAM, Flash Memory, and a USB drive are just some examples of articles including a computer-readable medium.

Figure 2:
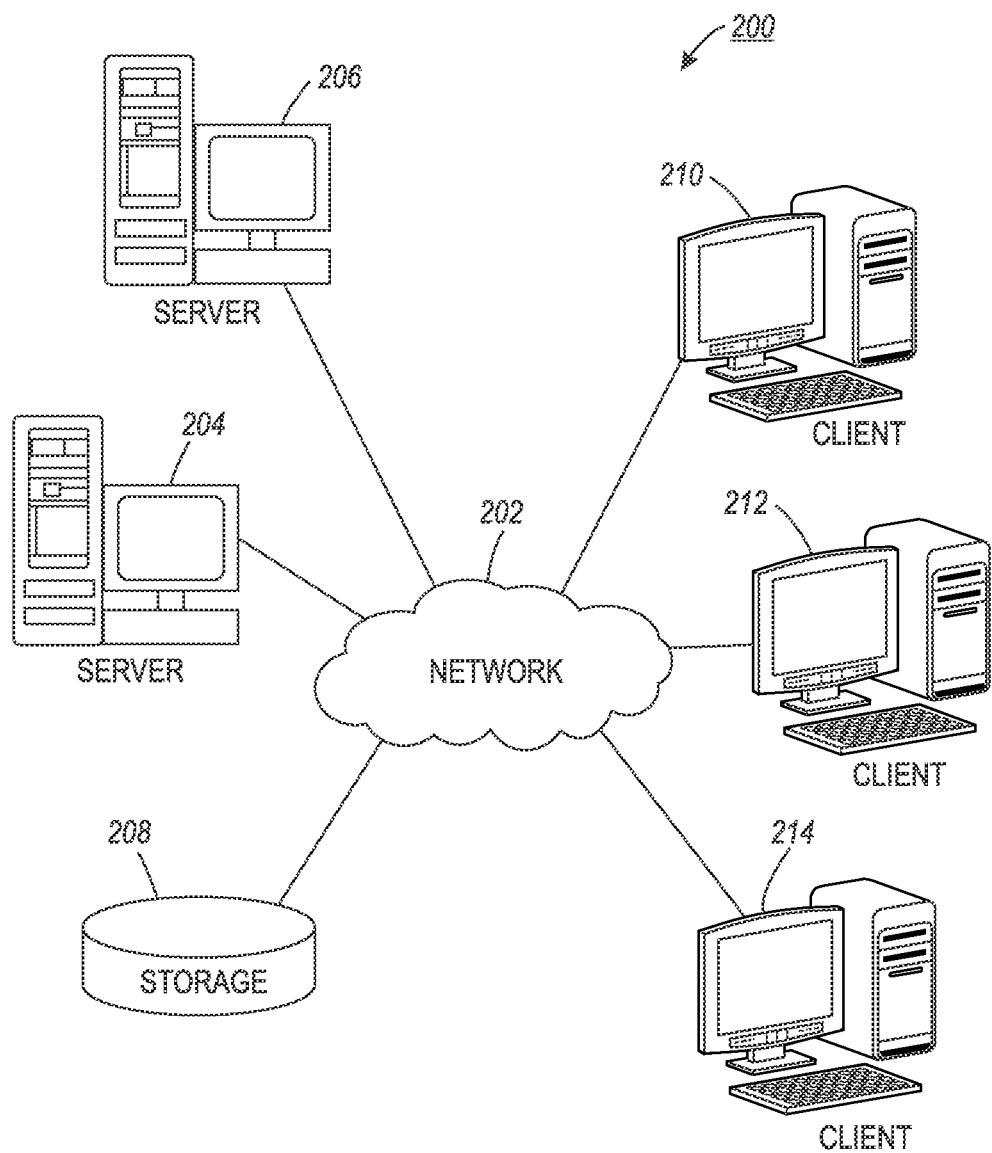
FIG. 2 depicts a graphical representation of a network of data-processing devices in which aspects of the present invention may be implemented.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 204 and 206 and a memory storage unit such as, for example, memory or database 208.

In the depicted example, server 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively, clients 210, 212, and 214 may be, for example, a photographic camera, video camera, tracking device, etc.

Computer system 100 can also be implemented as a server such as servers 204 and/or 206, depending upon design considerations. In the depicted example, server 204 provides data such as boot files, operating system images, applications, and application updates to clients 210, 212, and 214. Clients 210, 212, and 214 are clients to server 204 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

The following description is presented with respect to embodiments of the present invention, which can be embodied in the context of a data-processing system such as computer system 100, in conjunction with program 125, and data-processing system 200 and network 202 depicted in FIGS. 1 and 2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Figure 3:
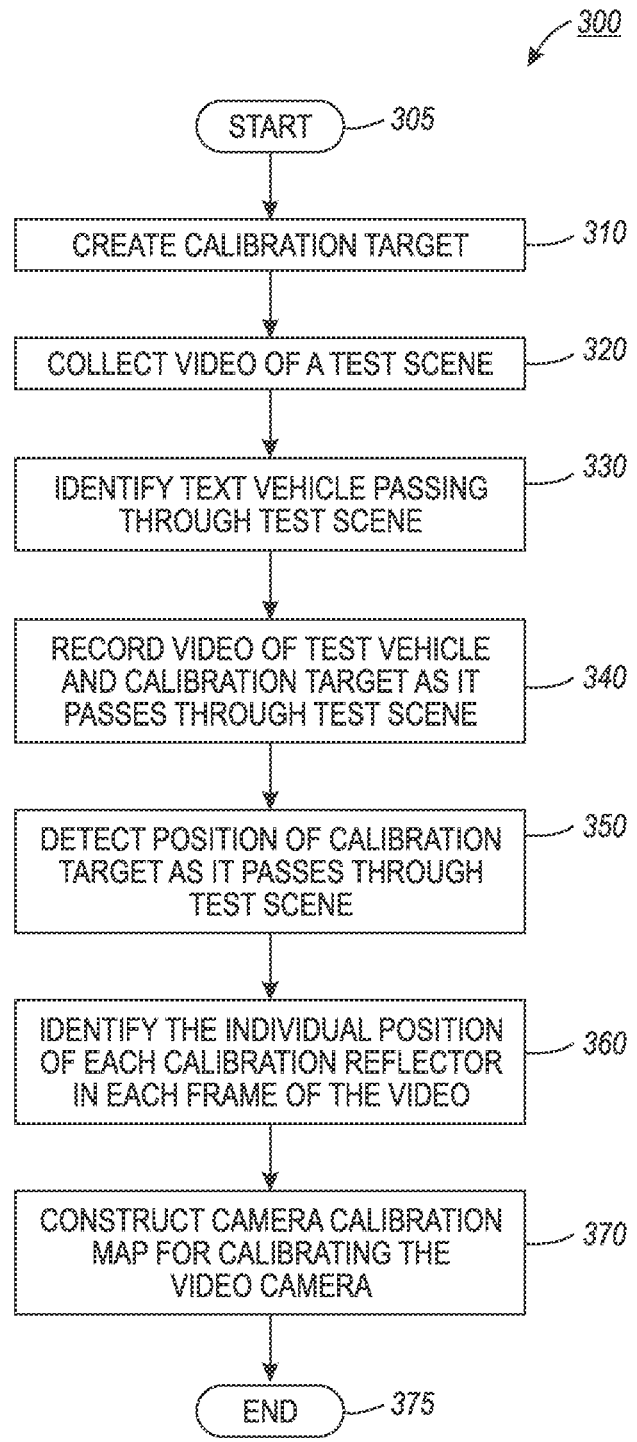
FIG. 3 depicts a high level flow chart illustrating logical operational steps in a camera calibration method in accordance with the disclosed embodiments.

FIG. 3 illustrates a high level flow chart 300 of logical operational steps associated with a camera calibration method in accordance with the disclosed embodiments. This method allows for calibration of a camera deployed in a real world traffic recording application without stopping or disrupting the traffic stream. The method begins at block 305.

Figure 6:
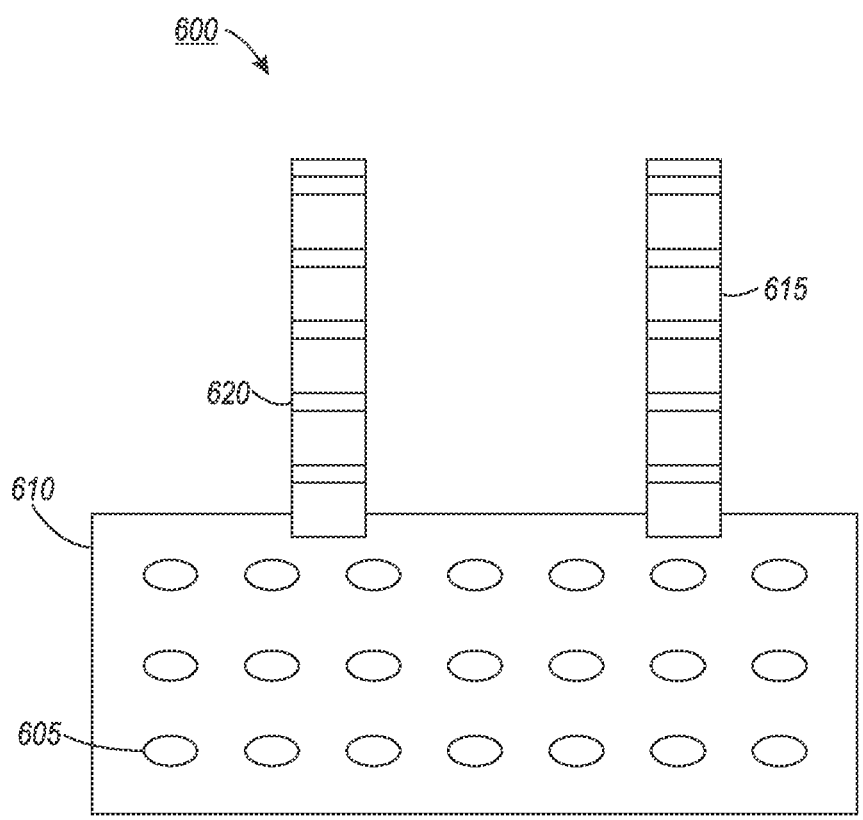
FIG. 6 depicts a target calibration grid in accordance with the disclosed embodiments.

Block 310 indicates that a calibration target is created. An illustration of an exemplary grid calibration target 600 is depicted in FIG. 6. The calibration target 600 is generally constructed to include a number of reflectors 605 organized in a known pattern on a rigid platform 610. In FIG. 6, the reflectors 605 are organized in a 3×7 grid pattern. The rigid platform can then be mounted to a vehicle (not shown). The calibration target 600 may also include vertical risers 615 with a number of reflectors 620 organized thereon. Other configurations of reflectors and/or calibration targets can also be used as necessary.

The calibration target 600 is preferably constructed to be easily identifiable by the camera both during the day and at night. Thus, in an exemplary embodiment the reflectors 605 may be 360-degree reflectors that may be internally or externally lit. The relative location of all of the reflectors, or other such elements, on the rigid platform 610 must also be precisely known. Finally, the calibration target 600 should be configured to cover as much of the test camera's field of view as possible. Thus the size and shape of the calibration target 600 may be varied according to the camera being used and the environment, or test scene, where the camera is deployed.

The camera to be calibrated may include any camera, but is preferably a camera already in use, or already installed to be used as a traffic surveillance camera. Such a camera may, for example, be monitoring vehicle speed, detecting red light violations, or collecting other traffic data on an open road, at an open intersection, or at any other such location. One advantage of the present invention is that the traffic flow at the test scene need not be diverted or interrupted. Thus, the camera to be calibrated may already be collecting video of the test scene. As indicated at block 320, it is necessary that the camera be configured to collect video of a test scene.

Once the calibration target has been constructed and mounted on the test vehicle and the test scene is being recorded by the camera, the test vehicle with the calibration target is driven through the test scene. At block 330, the test vehicle is identified by a test vehicle identification module. The key function of this module is to identify the test vehicle with the calibration targets when it appears in the field of view of the camera to be calibrated.

In an exemplary embodiment, the vehicle identification can be done using an automated license plate recognition (ALPR) engine. Each new vehicle that enters the scene is tested until the ALPR identifies the test vehicle. At this point, the method advances to block 340.

As depicted at block 340, the camera records video, comprising multiple frames, of the test vehicle and the calibration target as it passes through the test scene. Once the video is collected, the method advances to block 350, wherein a calibration point identification module is used to detect the positions of the calibration target in all the frames of the captured video. In the exemplary calibration target shown in FIG. 6, this includes finding the region that encloses all the reflectors.

Next, as illustrated at block 360, the individual position of each element in the calibration target is determined for each frame. This includes identifying the centroids of all the reflectors in the enclosed region for each frame of the video. The use of 360 degree reflectors can improve the accuracy of these measurements.

For the exemplary calibration target illustrated in FIG. 6, which includes 21 reflectors, the output of the calibration point identification module would be N sets of 21 centroids, wherein N indicates the total number of frames captured by the camera of the calibration target. It is important to note that the total number of frames will differ according to the speed of the test vehicle as it travels through the test scene and the total field of view of the camera. For example, as the test vehicle moves faster the total number of frames N will increase. Likewise, as the respective camera's field of view decreases, the total number of frames N will decrease.

Next, as shown at block 370, a camera calibration map or a mapping between the image coordinate and the real world coordinate is constructed using a camera calibration module. This step of mapping between image coordinates and real world coordinates can be accomplished in several ways as described herein.

Figure 4A:
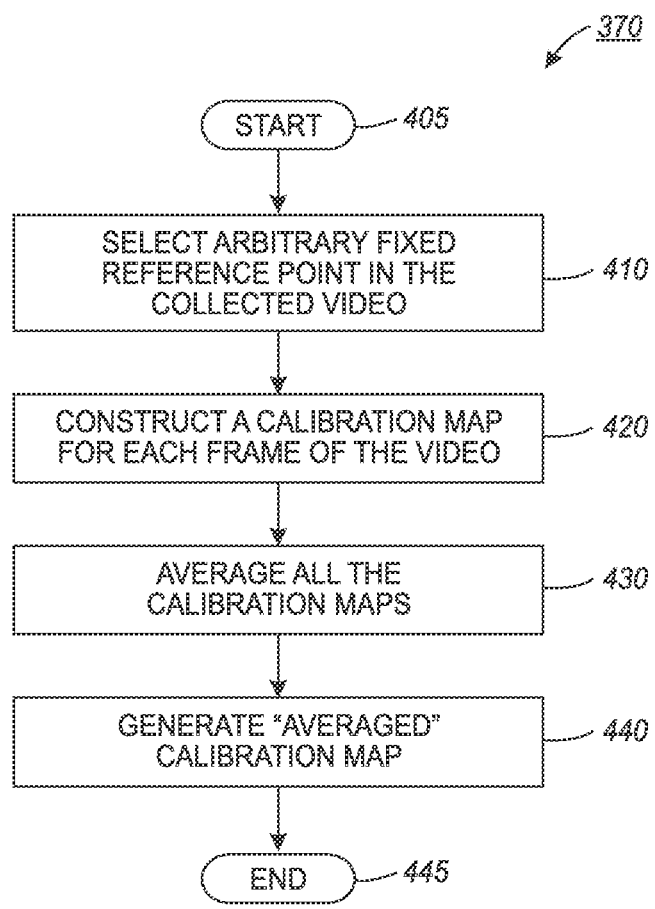
FIG. 4a depicts a detailed flow chart illustrating logical operational steps for constructing a calibration map in accordance with the disclosed embodiments.

FIG. 4a illustrates on alternative method of constructing a calibration map as described in block 370 of FIG. 3. First, at block 405, the method starts. Then, block 410 explains that an arbitrary fixed reference point is selected in the image coordinates to be the origin in the real-world coordinate system. In a preferred embodiment, this point can be selected as the middle of the image coordinates. Alternatively, this point can be selected as any other point, as may be necessary in a particular circumstance. It is important to note that the "z" coordinate in the real world coordinate system is preferably set to 0. This assumes the calibration target is set in the same plane as the road or at known height above the road. This allows the "z" coordinate to be ignored since it is preferably fixed in the plane of the road.

Once the origin is selected, the mapping to coordinates in the image coordinates can be derived based on the extracted N sets of centroids associated with the relative positions of the reflectors. As illustrated at block 420, one approach requires that a calibration map for each frame of the video be constructed. Thus, N calibration maps are constructed independently. Next, at block 430, the constructed calibration maps are averaged. It should be noted that because the reference origin is selected to be fixed, the average of these calibration maps is not dependent on the speed of the test vehicle.

Block 440 shows that these averaged maps are then embodied as an "averaged" calibration map. The method then ends at block 445. It should be appreciated that while this method is relatively simple, the results are less accurate than the preferred method of constructing a calibration map according to block 370 as illustrated by FIG. 4b.

Figure 4B:
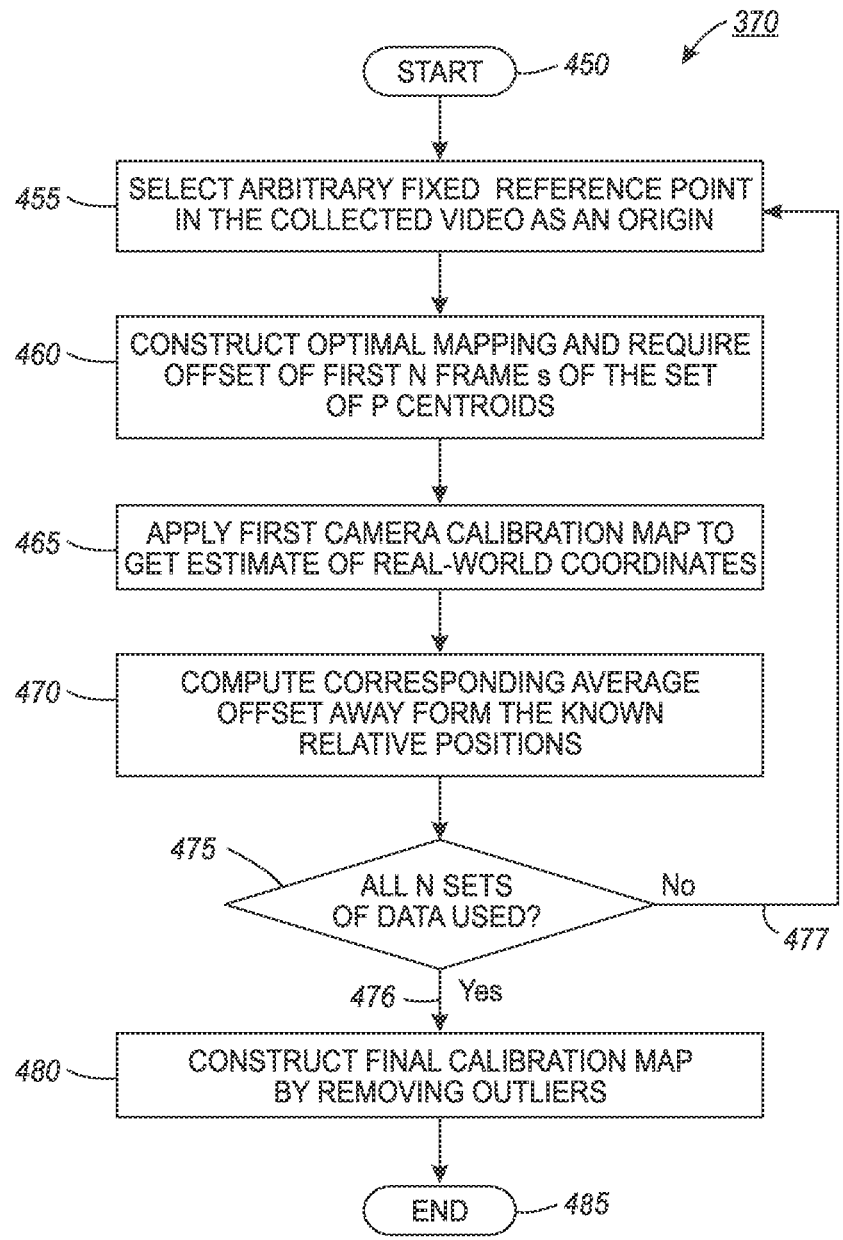
FIG. 4b depicts a detailed flow chart illustrating alternative logical operational steps for constructing a calibration map in accordance with the disclosed embodiments.

FIG. 4b starts at block 450. For purposes of these steps, it is necessary to define the centroids according to formula (1) wherein N indicates the total number of frames and P indicates the total number of reflectors:

$$(i_{np}, j_{np}), n=1\sim N, p=1\sim 21 \quad (1)$$

Further, the known relative position of the P centroids is given by formula (2):

$$(x_p^{(s)}, y_p^{(s)}) p=1\sim 21 \quad (2)$$

It should be noted that formula (2) assumes the calibration target is rigid, as required above. A robust and accurate camera calibration map can then be constructed iteratively using all N sets of data according to formulas (1) and (2).

As indicated by block 455, an arbitrary fixed reference point is selected in the image coordinates to be the origin in the real-world coordinate system, (the reference requirement) given by formula (3) as:

$$f_1:(i_0, j_0) \to (0,0) \quad (3)$$

And further, the first set of centroids for P total reflectors (for the 1st set of 21 centroids) can be given by formula (4) as:

$$f_1:(i_{1p}, j_{1p}) \to (x_p^{(s)} + o_x^1, y_p^{(s)} + o_y^1) p=1\sim 21 \quad (4)$$

An optimal mapping and the required offset can then be constructed so that a first camera calibration map will optimally satisfy the condition set by the chosen reference origin and the condition set by the known relative positions among the P centroids according to a least squares approximation. This can be considered the first iteration according to the first of N frames of the set of P centroids as shown at block 460.

Next at block 465, using the additional data set associated with the next frame of P centroids the first camera calibration map can be applied to get an estimate of the real-world coordinates. In other words, the previous mapping is applied to the new set of P centroids and is then used to compute the corresponding average offset away from the known relative positions for the present set of data, as illustrated at block 470. This averaging step removes the noise and aligns the two different sets of P centroids using the rigid body constraint.

The mapping of the second set of data is updated to satisfy equations (5) and (6) as follows:

$$f_2:(i_0,j_0) \to (0,0), f_2:(i_{1p}, j_{1p}) \to (x_p^{(s)} + o_x^1, y_p^{(s)} + o_y^1),$$

$$\text{and } f_2:(i_{2p}, j_{2p}) \to (x_p^{(s)} + o_x^2, y_p^{(s)} + o_y^2). \quad (5)$$

$$\text{Here}(o_x^2, o_y^2) = \frac{1}{21}\sum_{p=1}^{21}(f_1(i_{2p}, j_{2p}) - (x_p^{(s)}, y_p^{(s)})) \quad (6)$$

These steps are repeated iteratively until all N sets of data have been used to construct a complete calibration map as shown by block 475 and decision blocks 476 and 477.

As illustrated by block 480, a final calibration map can be constructed by removing outliers using the aforementioned estimations. In other words, from the iterative process described, an estimate of the real world coordinates of all the points and their average off-sets under a rigid body constraint is known. The error is computed between the coordinate and its offset for all the points and points that have large errors are removed. Using the remaining points at the final camera calibration map can be calculated. The method ends at block 485.

The data alignment and outlier algorithm described herein is a preferred method of constructing a camera calibration map because it can offer accurate estimation of camera height and can be used to construct full three-dimensional calibration maps. These calibration maps will be more robust and accurate and can be used at different time periods to build camera calibration maps over time.

Figure 5:
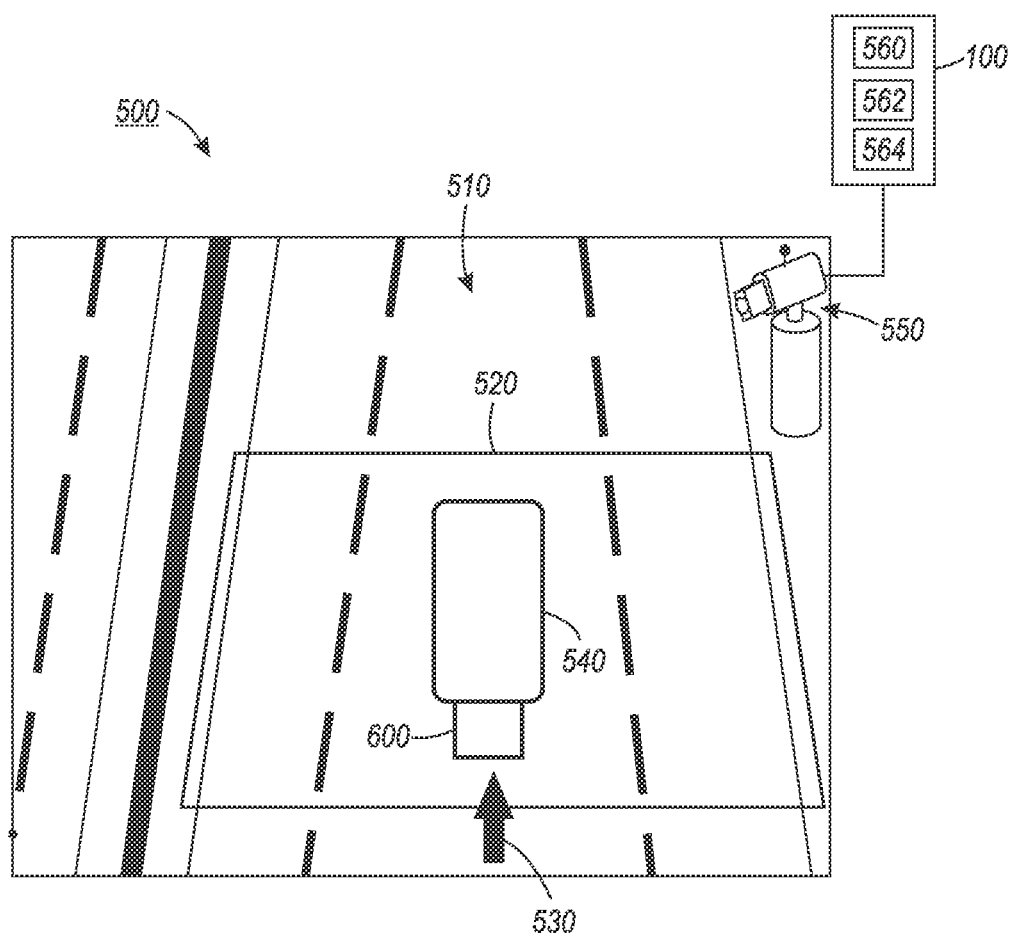
FIG. 5 depicts a block diagram of a camera calibration system in accordance with the disclosed embodiments.

FIG. 5 shows a block diagram of a camera calibration system 500 in accordance with a preferred embodiment of the present invention. A test vehicle 540 can be driven through a test scene 520 along an open road 510, intersection or other such environment. A calibration target 600 is mounted to the rear of the test vehicle 540. The calibration target 600 is configured to be mounted in the same plane as the road 510. However, risers such as risers 615 shown in FIG. 6 may also be mounted to the rear of the test vehicle 540 and in a plane perpendicular to the road 510.

In general, the test vehicle 540 and calibration target 600 travels along the road 510 in the direction of motion 530. A camera 550 can be present at the test scene 520. The camera's field of view can define the test scene 520. As the vehicle 540 passes through the test scene 520, video of the test vehicle 540 and the calibration target 600 is collected.

The collected video is sent to a test vehicle identification module 560 associated with a computer system 100. The test vehicle identification module is used to identify the test vehicle 540 as it enters the test scene 520, as a number of other vehicles may also be traveling through the test scene 520.

Next, a calibration point identification module 562 is configured to detect the position of the calibration target in each frame of the video recording and identify the corresponding individual position of each of the calibration reflector in each frame of the video. A camera calibration construction module 564 can then be used to construct a camera calibration map that can be used to calibrate the video camera.

FIG. 6 provides an illustration of an exemplary grid calibration target 600. The calibration target 600 can include a number of reflectors 605 organized in a known pattern on a rigid platform 610. The reflectors 605 are organized in grid pattern. In FIG. 6, the grid pattern shown is a 3×7 grid pattern. The rigid platform can be mounted to a vehicle. The calibration target 600 can also include vertical risers 615 with a number of reflectors 620 organized thereon. Other configurations of reflectors and/or calibration targets can also be used as necessary.

Based on the foregoing, it can be appreciated that a number of embodiments, preferred and alternative, are disclosed herein. For example, in one embodiment, a method and system for camera calibration comprises configuring a calibration target comprising calibration reflectors on a test vehicle, collecting video of a test scene with a video camera, identifying the test vehicle as it enters the test scene, recording a plurality of video frames of the calibration target as it passes through the test scene, detecting the position of the calibration target in each frame of the recorded frames, identifying the corresponding individual position of each calibration reflector for each frame of the recorded frames, and constructing a camera calibration map to calibrate the video camera.

In one embodiment, identifying the test vehicle as it passes through the test scene includes applying an automated license plate recognition check for each vehicle that enters the test scene until the test vehicle is identified.

The calibration target can be configured to be a grid of at least four calibration reflectors. The relative location of each calibration reflector within the grid is known and the grid covers as much of the field of view of the test scene as possible. Identifying the individual position of each of the calibration reflectors for each frame of collected video can include identifying a centroid for each of the calibration reflectors in each frame of the video.

In one embodiment, constructing the camera calibration map can further comprise selecting an arbitrary fixed reference point in the collected video as an origin, constructing a first calibration map for each frame of the collected video, and then averaging all of the first calibration maps.

In a preferred alternative embodiment, constructing the camera calibration map comprises selecting an arbitrary fixed reference point in the collected video as an origin and applying an iterative data alignment and outlier algorithm.

The method can include the use of a traffic surveillance video feed, wherein the test scene is an open roadway or an open traffic intersection.

In an another embodiment of the invention, a system for camera calibration comprises a calibration target comprising calibration reflectors mounted on a test vehicle, a video camera configured to collect video of a test scene, a test vehicle identification module configured to identify the test vehicle as it enters the test scene and record a plurality of video frames of the calibration target as it passes through the test scene, a calibration point identification module configured to detect the position of the calibration target in each frame of the video and identify a corresponding individual position of each of the calibration reflectors in each frame, and a camera calibration construction module configured to construct a camera calibration map to calibrate the video camera.

The test vehicle identification module is further configured to apply an automated license plate recognition check for each vehicle that enters the test scene until the test vehicle is identified.

The calibration target is a grid of at least four calibration reflectors wherein the relative location of each of the calibration reflectors within the grid is known and the grid covers as much of the field of view of the test scene as possible. The calibration point identification module is configured to identify a centroid for each of the calibration reflectors in each frame of the video.

In one embodiment of the invention, the camera calibration construction module can select an arbitrary fixed reference point in the collected video as an origin, construct a first calibration map for each frame of the collected video, and average all of the first calibration maps.

In a preferred alternative embodiment of the invention, camera calibration construction module is further configured for selecting an arbitrary fixed reference point in the collected video as an origin and applying an iterative data alignment and outlier algorithm.

The collected video may be, for example, a traffic surveillance video feed with the test scene being an open roadway or an open traffic intersection.

In another embodiment of the invention, a method for camera calibration comprises configuring a calibration target comprising a plurality of calibration reflectors on a test vehicle wherein the calibration target is configured to be a grid of calibration reflectors wherein the relative location of each of the plurality of calibration reflectors within the grid is known, collecting video of a test scene with a video camera, identifying the test vehicle as it enters the test scene by applying an automated license plate recognition check for each vehicle until the test vehicle is identified, recording a plurality of video frames of the calibration target comprising the calibration reflectors as they pass through the test scene, detecting the position of the calibration target in each frame of the plurality of recorded frames, identifying the corresponding individual position of the centroid of each of the calibration reflectors for each frame of video, and constructing a camera calibration map to calibrate the video camera.

The method of constructing the camera calibration map may further comprise selecting an arbitrary fixed reference point in the collected video as an origin, constructing a first calibration map for each frame of the collected video, and averaging all of the first calibration maps.

In a preferred alternative embodiment, the method of constructing a camera calibration map comprises selecting an arbitrary fixed reference point in the collected video as an origin, and applying an iterative data alignment and outlier algorithm.

The test scene can be an open roadway or an open traffic intersection.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for camera calibration comprising:
configuring a calibration target comprising a rigid platform and a plurality of internally lit calibration reflectors said plurality of calibration reflectors configured in a grid of at least four of said calibration reflectors mounted on said rigid platform in a plane parallel to a road and mounted to a rear of a test vehicle wherein said calibration target is towed by said test vehicle;
recording a plurality of video frames of said calibration target comprising said plurality of calibration reflectors as they pass through a test scene wherein a position of said calibration target and a position of each of said calibration reflectors in each frame of said plurality of recorded frames is collected;
identifying a centroid for each of said calibration reflectors in each frame of said recorded video;
identifying a region within said video frame that encloses all of said calibration reflectors for each frame of said collected video; and
constructing a camera calibration map to calibrate said video camera wherein constructing said camera calibration map further comprises:
selecting an arbitrary fixed reference point in said recorded video frames as an origin in a real world coordinate system;
setting a coordinate of said origin, in said real world coordinate system, associated with a plane parallel to said road, to zero;
constructing a first calibration map for each frame of said recorded video according to a relative position of said centroids for each of said calibration reflectors according to said selected origin; and
averaging all of said first calibration maps.

2. The method of claim 1 further comprising:
collecting said video of said test scene with a video camera; and
applying an automated license plate recognition check for each vehicle that enters said test scene until said test vehicle is identified.

3. The method of claim 1 wherein said calibration target is configured to further comprise at least two risers connected to said rigid platform with associated calibration reflectors thereon in a plane perpendicular to the road, wherein a relative location of each of said plurality of calibration reflectors within said grid is known, and said grid covers as much of a field of view of said test scene as possible.

4. The method of claim 1 wherein constructing a camera calibration map further comprises:
constructing an optimal mapping with a required offset such that said optimal mapping satisfies a least squares approximation given by said selected origin and said centroid of each or said calibration reflectors;
applying said optimal mapping to estimate, real world, coordinates of a next frame of collected video;
computing a corresponding average offset from known relative positions of said centroids;
iterating said process for each of said collected video frames;
removing data with a large average offset according to a rigid body constraint; and
constructing a final calibration map according to said remaining data.

5. The method of claim 1 wherein said collected video comprises a traffic surveillance video feed.

6. The method of claim 5 wherein said test scene comprises one of:
an open roadway; or
an open traffic intersection.

7. A system for camera calibration comprising:
a calibration target comprising a rigid platform and a plurality of internally lit calibration reflectors said plurality of calibration reflectors configured in a grid of at least four calibration reflectors mounted on said rigid platform in a plane parallel to a road and mounted to the rear of a test vehicle wherein said calibration target is towed by said test vehicle;
a video camera configured to collect video of a test scene;
a test vehicle identification module configured to identify said test vehicle as it enters said test scene and record a plurality of video frames of said calibration target comprising said plurality of calibration reflectors as they pass through said test scene;
a calibration point identification module configured to detect the position of said calibration target in each frame of said plurality of recorded frames, identify a corresponding individual position of each of said calibration reflectors for each frame of said plurality of recorded frames, identify a centroid for each of said calibration reflectors in each frame of said plurality of recorded frames and a region within said video frame that encloses all of said calibration reflectors for each of said plurality of recorded frames; and
a camera calibration construction module configured select an arbitrary fixed reference point in said collected video as an origin in a real world coordinate system, set a coordinate of said origin, in a real world coordinate system, associated with a plane parallel to said road to zero construct a first calibration map for each of said plurality of recorded frames according to a relative position of said centroids for each of said calibration reflectors according to said selected origin, and average all of said first calibration maps to construct a camera calibration map.

8. The system of claim 7 wherein said test vehicle identification module if further configured to apply an automated license plate recognition check for each vehicle that enters said test scene until said test vehicle is identified.

9. The system of claim 7 wherein said calibration target is configured to further comprise at least two risers connected to said rigid platform with associated calibration reflectors thereon in a plane perpendicular to the road, wherein a relative location of each of said plurality of calibration reflectors within said grid is known and said grid covers as much of a field of view of said test scene as possible.

10. The system of claim 9 wherein said camera calibration construction module is further configured for:
constructing an optimal mapping with a required offset such that said optimal mapping satisfies a least squares approximation given by said selected origin and said centroid of each or said calibration reflectors;
applying said optimal mapping to estimate real world coordinates of a next frame of collected video;
computing a corresponding average offset from known relative positions of said centroids;
iterating said process for each of said collected video frames;
removing data with a large average offset according to a rigid body constraint; and constructing a final calibration map according to said remaining data.

11. The system of claim 7 wherein said collected video comprises a traffic surveillance video feed.

12. The system of claim 11 wherein said test scene comprises one of:
an open roadway; or
an open traffic intersection.

13. A method for camera calibration comprising:
configuring a calibration target comprising a rigid platform and a plurality of internally lit calibration reflectors said plurality of calibration reflectors configured in a grid of at least four calibration reflectors mounted on said rigid platform in a plane parallel to a road and mounted to the rear of a test vehicle wherein said calibration target is towed by said test vehicle and wherein said calibration target is configured to be a grid of calibration reflectors with at least two riser with associated calibration reflectors thereon wherein a relative location of each of said plurality of calibration reflectors is known;
collecting video of a test scene with a video camera;
identifying said test vehicle as it enters said test scene by applying an automated license plate recognition check for each vehicle that enters said test scene until said test vehicle is identified;
recording a plurality of video frames of said calibration target comprising said plurality of calibration reflectors as they pass through said test scene;
detecting the position of said calibration target in each frame of said plurality of recorded frames;
identifying a corresponding individual position of a centroid of each of said calibration reflectors for each frame of said plurality of recorded frames;
identifying a region that encloses all of said calibration reflectors in each frame of said collected video; and
constructing a camera calibration map to calibrate said video camera wherein constructing said camera calibration map further comprises:
selecting an arbitrary fixed reference point in said collected video as an origin in a real world coordinate system;
setting a coordinate of said origin, in a real world coordinate system, associated with a plane parallel to said road to zero;
constructing a first calibration map for each frame of said collected video according to a relative position of said centroids for each of said calibration reflectors according to said selected origin; and
averaging all of said first calibration maps.

14. The method of claim 13 wherein constructing a camera calibration map further comprises:
constructing an optimal mapping such that said optimal mapping satisfies a least squares approximation given by said selected origin and said centroid of each or said calibration reflectors;
applying said optimal mapping to estimate real world coordinates of a next frame of collected video;
computing a corresponding average offset from known relative positions of said centroids;
iterating said process for each of said collected video frames;
removing data with a large average offset according to a rigid body constraint; and
constructing a final calibration map according to said remaining data.

15. The method of claim 13 wherein said test scene comprises one of:
an open roadway; or
an open traffic intersection.

* * * * *